United States Patent
Oh et al.

(10) Patent No.: US 7,478,792 B2
(45) Date of Patent: Jan. 20, 2009

(54) MICROVALVE HAVING MAGNETIC WAX PLUG AND FLUX CONTROL METHOD USING MAGNETIC WAX

(75) Inventors: Kwang-wook Oh, Hwaseong-si (KR); Kak Namkoong, Seoul (KR); Chin-sung Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 411 days.

(21) Appl. No.: 11/396,764

(22) Filed: Apr. 3, 2006

(65) Prior Publication Data

US 2006/0219308 A1    Oct. 5, 2006

(30) Foreign Application Priority Data

Apr. 2, 2005    (KR) .................. 10-2005-0027829

(51) Int. Cl.
*F16K 31/00* (2006.01)
*F16K 31/18* (2006.01)

(52) U.S. Cl. ................. 251/11; 251/129.01; 137/251.1; 137/828

(58) Field of Classification Search .................. 251/11, 251/129.01; 137/251.1, 827, 828
See application file for complete search history.

(56) References Cited

U.S. PATENT DOCUMENTS

| 6,375,901 | B1 | 4/2002 | Robotti et al. | |
| 6,575,188 | B2* | 6/2003 | Parunak | 137/251.1 |
| 6,679,279 | B1 | 1/2004 | Liu et al. | 137/13 |
| 7,195,036 | B2* | 3/2007 | Burns et al. | 137/828 |
| 2004/0219732 | A1 | 11/2004 | Burns et al. | 438/200 |

OTHER PUBLICATIONS

"Magnetic Fluid and Nanoparticle Applications to Nanotechnology", Author: Markus Zahn, Journal of Nanoparticle Research 3; 73-78, 2001.

* cited by examiner

*Primary Examiner*—John K Fristoe, Jr.
(74) *Attorney, Agent, or Firm*—Cantor Colburn LLP

(57) ABSTRACT

Provided is a microvalve having a magnetic wax plug which includes a micro fluidic structure having an inlet portion and an outlet portion, a magnetic wax plug provided at a predetermined section where the inlet portion and the outlet portion meet, existing in a solid state, melted at a temperature higher than a predetermined temperature, and reversibly moving along a magnetic field, so as to control flux of a fluid through the micro fluidic structure, a heating portion provided corresponding to the section and heating the magnetic wax plug to be melted, and a magnetic field application portion selectively applying a magnetic field to a position where the melted magnetic wax plug arrives.

20 Claims, 7 Drawing Sheets

MICROVALVE HAVING MAGNETIC WAX PLUG AND FLUX CONTROL METHOD USING MAGNETIC WAX

CROSS-REFERENCE TO RELATED PATENT APPLICATIONS

This application claims the benefit of Korean Patent Application No. 10-2005-0027829, filed on Apr. 2, 2005, in the Korean Intellectual Property Office, the disclosure of which is incorporated herein in its entirety by reference.

BACKGROUND OF THE INVENTION

1. Field of the Invention

The present invention relates to a microvalve and a microchip having a micro fluidic structure, and more particularly, to a bi-stable and phase change type microvalve provided in a micro fluidic structure and a microchip including the microvalve.

2. Description of the Related Art

In general, a valve refers to an apparatus that is connected to a pipe to control the amount of flow or pressure of a fluid. A microvalve and other apparatuses comprising a microvalve related to a micro fluidic structure have received wide attention, particularly in a bio-chemical field including a micro total analysis system (µTAS). The microvalve is widely used not only in the µTAS related to the development of new medicines, a clinical diagnosis system, and a biomedical research field such as a DNA, but also in an inkjet print field.

The microvalve developed with the development of a micro-electromechanical system (MEMS), or a so-called MEMS valve, has a important role in the micro fluidic structure with a micropump, as an important device having functions of allowing, limiting, and blocking the flow of a fluid including gas or liquid. The microvalves manufactured using a fine processing technology have a variety of structures and sizes from several micrometers to about 1 mm according to the type of driving and purpose.

A phase change valve has been studied among the various types of microvalves. The phase change valve refers to a tangible valve that is included in the micro fluidic structure to exist in a solid state and controls the flow of a fluid in a mode. The state of the phase change valve is changed from the solid state to a liquid state, causing a displacement or deformation, when the mode is changed to another mode. U.S. Pat. No. 6,679,279 and U.S. Patent Publication No. 2004-0219732 disclose the above phase change valve. A conventional phase change valve is described below with reference to FIGS. 1A, 1B, 2A, and 2B.

FIGS. 1A and 1B show an example of the conventional phase change valve, in which FIG. 1A shows a closed mode in which a channel is closed and FIG. 1B shows an open mode in which the channel is open. Referring to FIGS. 1A and 1B, a microchannel 21 is formed in a substrate 20. A well 22 is formed at a side of the channel 21. A solid wax plug 40 is provided in the microchannel 21 at the upper stream thereof with respect to the well 22. A solid wax is a material which exists in a solid state at the room temperature and its fluidity grows as it is heated. A typical material for the solid wax is paraffin wax.

A heating portion 30 capable of selectively radiating heat is provided around the solid wax plug 40. When the heating portion 30 radiates heat in the state as shown in FIG. 1A, the solid wax plug 40 is melt. A melt wax 40' flows into the well 22 by the pressure of a fluid flowing in the microchannel 21 and becomes solid in the well 22. However, since the mode change of the conventional phase change valve 101 is irreversible, once the valve opens, the valve cannot be reused.

FIGS. 2A and 2B show another example of the conventional phase change valve. Referring to FIGS. 2A and 2B, a phase change valve 102 has a Y shaped connection portion where an inlet portion 23, an outlet portion 24, and a vent portion 25 meet. A heating portion 30 is provided a portion extending from the Y shaped connection portion to the vent portion 25. As shown in FIG. 2A, when the valve 102 is in an open mode, a solid wax plug 42 is located in the Y shaped connection portion. When the valve 102 is in a closed mode as shown in FIG. 2B, the solid wax plug 42 is moved to the vent portion 25.

For mode change, the solid wax plug 42 is melt using the heating portion 30 and a melted wax is moved by an air pressure and vacuum chamber (or pump) that is selectively connected to a side of the vent portion 25. Thus, this type of the valve 102 needs a connection to a high pressure or vacuum chamber (or pump) using another valve for the driving of the valve. To facilitate miniaturization of the valves in units of micrometers and provide a micro fluidic structure which can be reused, the above disadvantages that the conventional phase change valves 101 and 102 have must be overcome.

SUMMARY OF THE INVENTION

To solve the above and/or other problems, the present invention provides a microvalve which requires the minimum number of additional parts for valve driving microvalve and can be reused by a reversible mode change.

The present invention provides a microchip having a micro fluidic structure to which the microvalve is applied.

According to an aspect of the present invention, a microvalve having a magnetic wax plug comprises a micro fluidic structure having an inlet portion and an outlet portion, a magnetic wax plug provided at a predetermined section where the inlet portion and the outlet portion meet, existing in a solid state, melted at a temperature higher than a predetermined temperature, and reversibly moving along a magnetic field, so as to control flux of a fluid through the micro fluidic structure, a heating portion provided corresponding to the section and heating the magnetic wax plug to be melted, and a magnetic field application portion selectively applying a magnetic field to a position where the melted magnetic wax plug arrives.

According to another aspect of the present invention, a microchip using a magnetic wax which performs a chemical reaction test with a small amount of a liquid test material using a micro fluidic structure formed on a substrate comprises a micro fluidic structure having a fine channel through which the liquid test material passes, and a magnetic wax member provided at a predetermined section of the micro fluidic structure, existing in a solid state, melted at a temperature higher than a predetermined temperature, and reversibly moving along a magnetic field, so as to control flux of a fluid through the micro fluidic structure.

According to another aspect of the present invention, a microchip unit using a magnetic wax including a microchip which performs a chemical reaction test with a small amount of a liquid test material using a micro fluidic structure formed on a substrate and a driving apparatus portion accommodating and driving the microchip comprises a micro fluidic structure having a fine channel through which the liquid test material passes, and a magnetic wax member provided at a predetermined section of the micro fluidic structure, existing in a solid state, melted at a temperature higher than a predetermined temperature, and reversibly moving along a magnetic field, so as to control flux of a fluid through the micro fluidic structure, wherein the driving apparatus portion comprises a heating portion provided to correspond to a predetermined section of the micro fluidic structure and radiating heat to melt the magnetic wax member, and a magnetic field application portion selectively applying a magnetic field to a position where the melted magnetic wax member arrives.

According to another aspect of the present invention, a method for controlling flux of a fluid in a micro fluidic structure by applying heat to a solid wax in the micro fluidic structure to move in a melted state comprises preparing a magnetic wax formed of a homogenous mixture of a ferrofluid and the solid wax and arranging the magnetic wax in a predetermined section of the micro fluidic structure, and controlling flux of the fluid by melting the magnetic wax by applying heat to the section and moving the magnetic wax by applying a magnetic field to a position where the melted magnetic wax arrives.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1A:
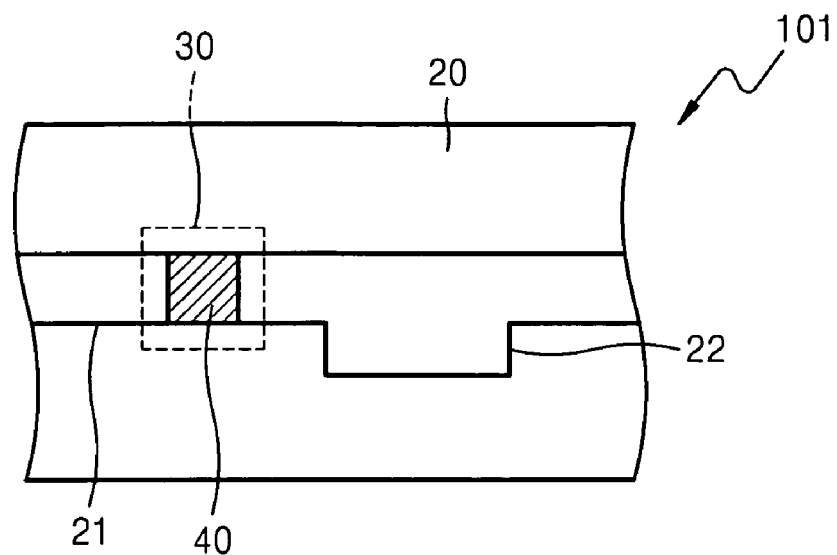
FIGS. 1A and 1B show an example of the conventional phase change valve.
Figure 1B:
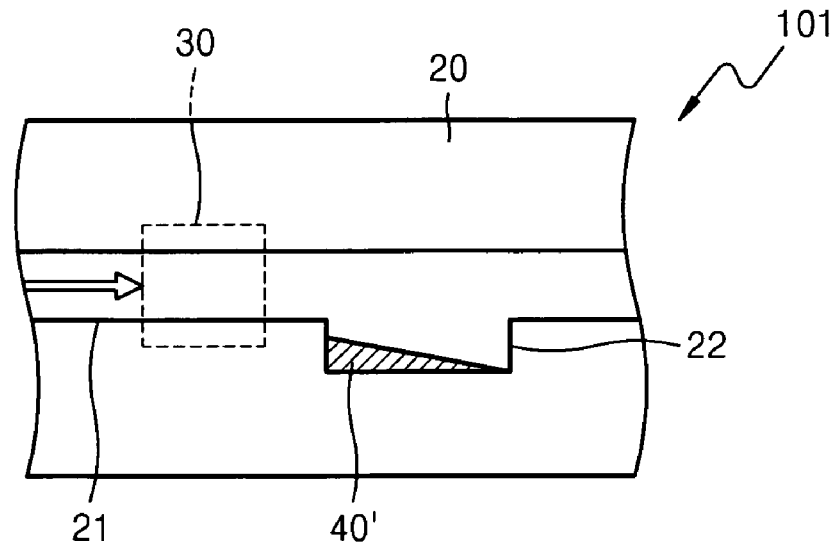
Figure 2A:
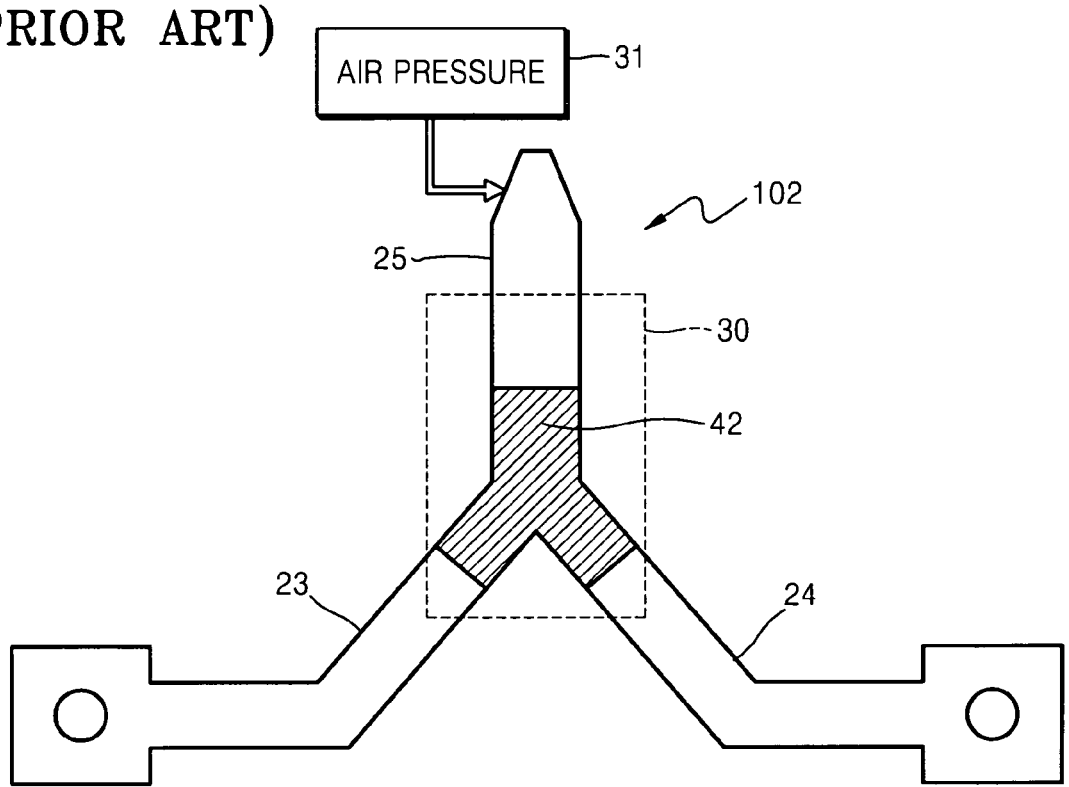
FIGS. 2A and 2B show another example of the conventional phase change valve.
Figure 2B:
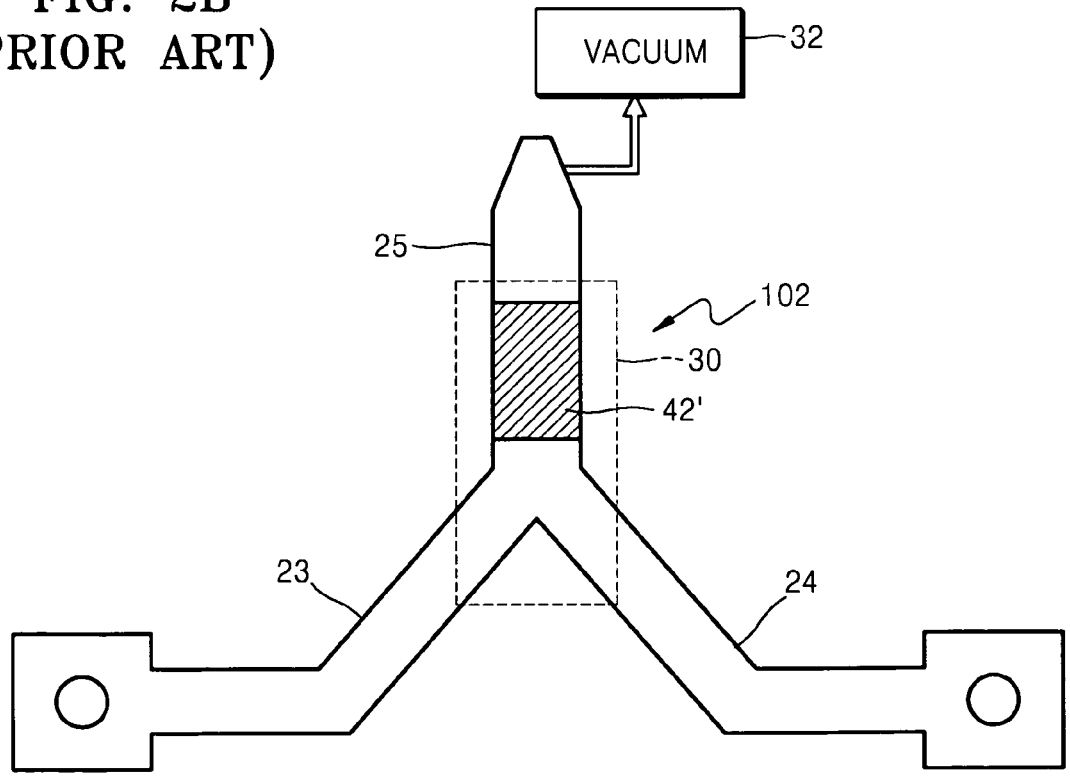
Figure 3:
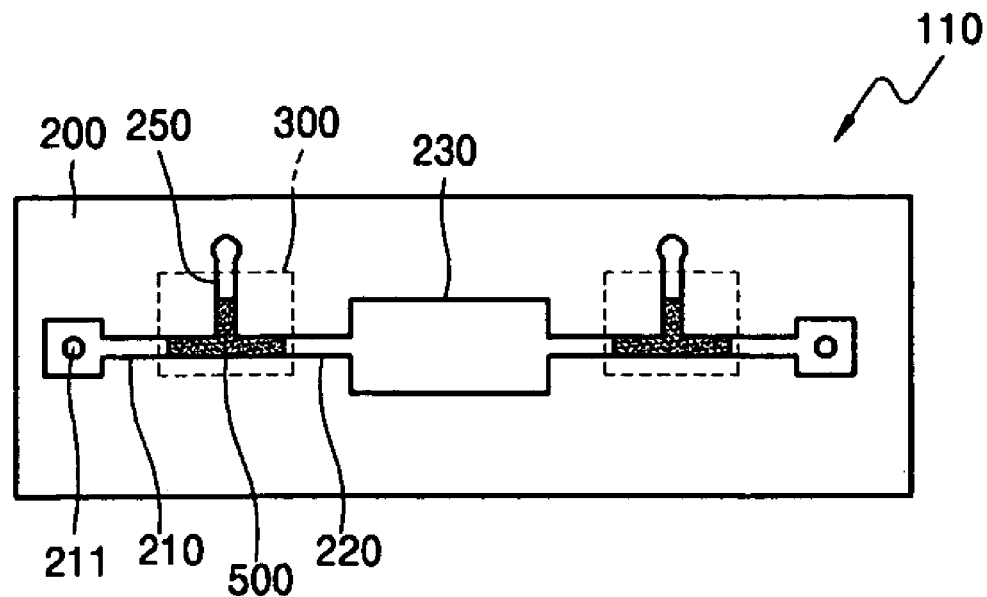
FIG. 3 shows a microchip having a microvalve according to an embodiment of the present invention.

Throughout the accompanying drawings, the same reference numerals indicate the same elements having the same functions. FIG. 3 shows a microchip having a microvalve according to an embodiment of the present invention. Referring to FIG. 3, a microchip 110 has a predetermined micro fluidic structure formed in a substrate 200. The micro fluidic structure includes a plurality of microchannels and a microchamber 230. The microchannels include an inlet portion 210 having a test material input hole 211 at an end thereof, an outlet portion 220 connected to the microchamber 230, and a vent portion 250 which are connected together by a Y shaped or T-shaped connection portion. A magnetic wax member 500 is provided in the Y-shaped connection portion. A heating portion 300 capable of melting the magnetic wax member 500 by radiating heat is provided around the Y-shaped connection portion. The microchip 110 can be provided by itself or as a microchip unit including the microchip with a driving apparatus portion (not shown) for driving the microchip 110.

The micro fluidic structure is a structure in which at least one dimension has a size of several or several hundreds of micrometers and includes a channel, a chamber, a pipe, or a combination thereof through which a fluid such as gas or liquid can flow. The micro fluidic structure can include an actuator such as a valve or pump. As an example of the micro fluidic structure, the inlet portion 210, the outlet portion 220, and the vent portion 250 are connected at a point by a Y-shaped or Y-shaped connection portion, as shown in FIG. 3. In addition, a variety of shapes are available for the connection portion.

The magnetic wax is a homogenous mixture of a ferrofluid and a solid wax which exits in a solid state at the room temperature and in a liquid state at a high temperature, exhibiting fluidity, and a material that has a magnetism and flows along a magnetic filed. The ferrofluid includes a magnetic particle exhibiting a ferromagnetic property, a surfactant enclosing the surface of the magnetic particle, and a carrier. The carrier is formed of a hydrocarbon based material for the homogenous mixture with common solid wax. The solid wax, as a hydrocarbon based material, exits in a solid state at the room temperature and has a fluidity at a high temperature. A common paraffin wax is used as the solid wax. The property of the magnetic wax formed by mixing a ferrofluid and paraffin wax is briefly described as a paraffin-based ferrofluid in a document entitled "Ferrofluid and Nanoparticle Applications to Nanotechnology" (Markus Zahn, Journal of Nanoparticle Research, vol 3, pp. 73-78, 2001).

The heating portion 300 may be a resistance heating unit installed on the substrate 200 and radiating heat by receiving electrical energy from the outside. Alternatively, the heating portion 300 can be installed at the driving apparatus portion accommodating and driving the microchip 110 to transfer heat around the magnetic wax member 500.

The magnetic wax member 500 melted by the heating portion 300 is moved by a magnetic field applied at a selected position by a magnetic field application portion (not shown). The magnetic wax member 500 that is melted and moved is cooled and solidified again, forming a new mode, so that the flux in the micro fluidic structure is controlled.

The magnetic field application portion may be a solenoid portion selectively acting to at least two positions of the microchip 110. In this case, the solenoid portions can be installed on the microchip 110 itself or on the driving apparatus portion which accommodates and drives the microchip 110. Also, the magnetic field application portion may be at least one permanent magnet affecting the magnetic wax member 500 while moving outside the microchip 110. The permanent magnet can be installed on the driving apparatus portion capable of moving.

Figure 4:
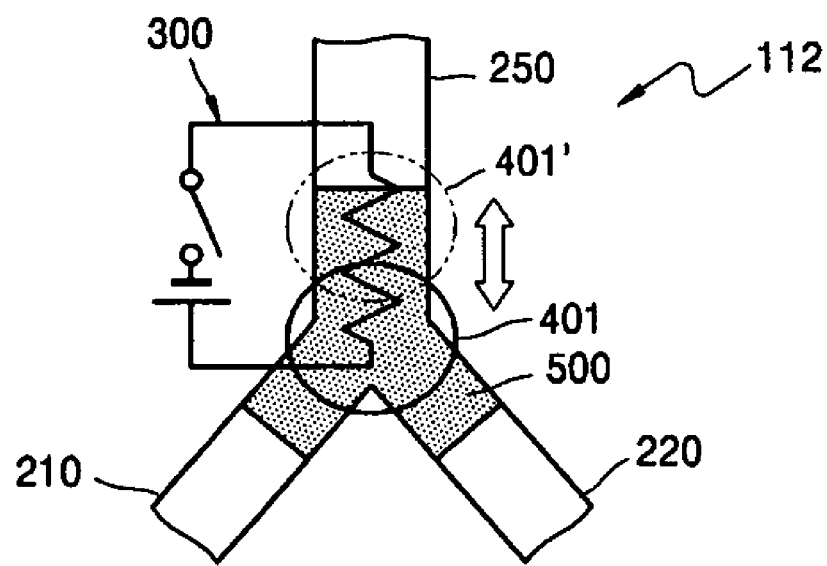
FIG. 4 shows the microvalve according to an embodiment of the present invention.

FIG. 4 shows the microvalve according to an embodiment of the present invention. Referring to FIG. 4, a microvalve 112 includes a Y-shaped connection portion where an inlet portion 210, an outlet portion 220, and a vent portion 250 meet at one point. The magnetic wax member 500 is selectively located in the Y-shaped connection portion or the vent portion 250. The heating portion 300 which can melt the magnetic wax member 500 is provided around the Y-shaped portion. The heating portion 300 has a switch (not shown) so as to be selectively radiate heat only when the mode of the microvalve 112 changes.

Also, the microvalve 112 includes magnetic field application portions 401 and 401' which selectively apply a magnetic field to the Y-shaped connection portion and the vent portion 250 to move the magnetic wax member 500 that is melted. The magnetic field application portion may be a permanent magnet which can move between two positions or a solenoid portion located at each of the two positions and selectively applying a magnetic field.

With the following description on the operation of the microvalve according to the present invention, the characteristic features of the microvalve and a flux control method using a magnetic wax are described in detail. FIGS. 5A through 5F show the operation of the microvalve of FIG. 4. The microvalve 112 according to the above embodiment has a closed mode for blocking the flux through the inlet portion 210 and the outlet portion 220 and an open mode for allowing the flux.

Figure 5A:
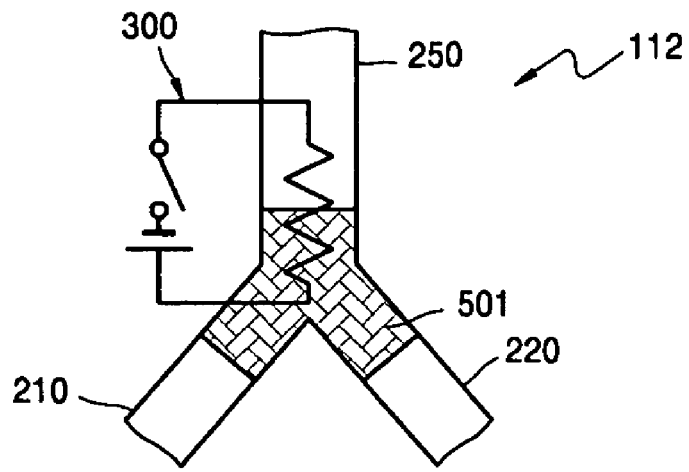
FIGS. 5A through 5F show the operation of the microvalve of FIG. 4.
Figure 5B:
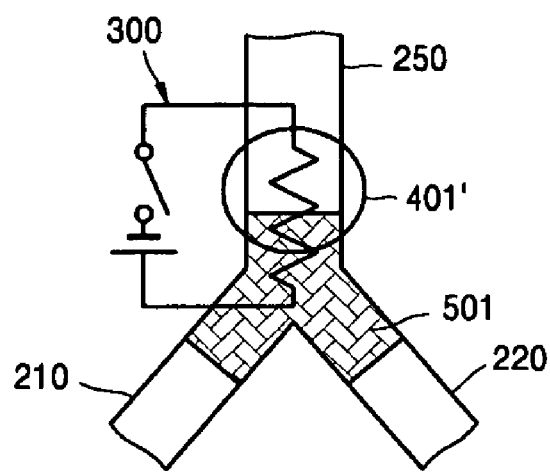
Figure 5C:
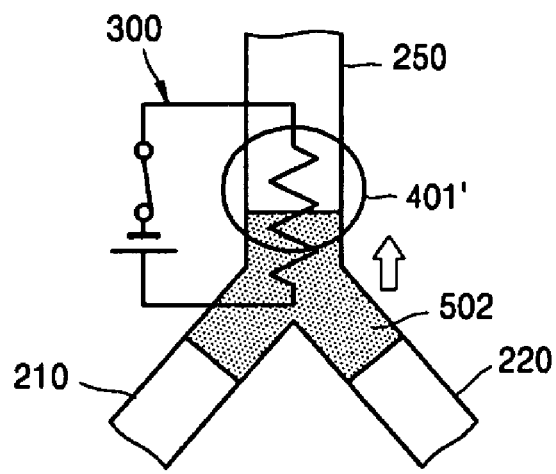
Figure 5D:
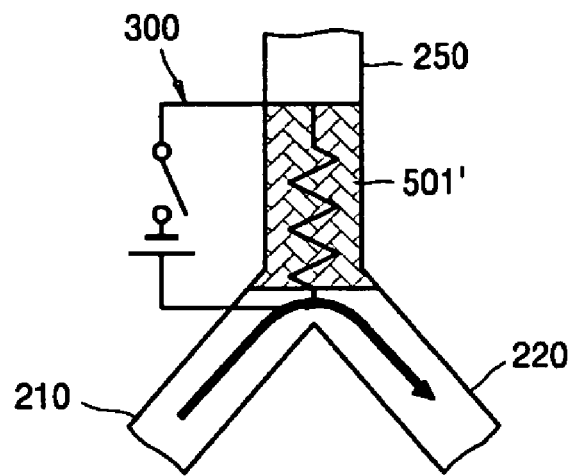

FIG. 5A shows the closed mode. In FIG. 5A, a magnetic wax plug 501 in a solid state at the room temperature clogs the center of the Y-shaped connection portion. FIGS. 5B through 5D show the process of conversion from the closed mode to the open mode. Referring to FIG. 5B, the magnetic field application portion 401' is located at the vent portion 250. Next, as shown in FIG. 5C, the heating portion 300 is operated to heat the magnetic wax plug 501. A melted magnetic wax 501' having a fluidity is moved toward the vent portion 250 by the magnetic field application portion 401'. The operation of the heating body 300 is stopped and the melted magnetic wax 501' is cooled as shown in FIG. 5F and located in the vent portion 250. Thus, the open mode is formed and the flux between the inlet portion 210 and the outlet mode 220 is allowed.

Figure 5E:
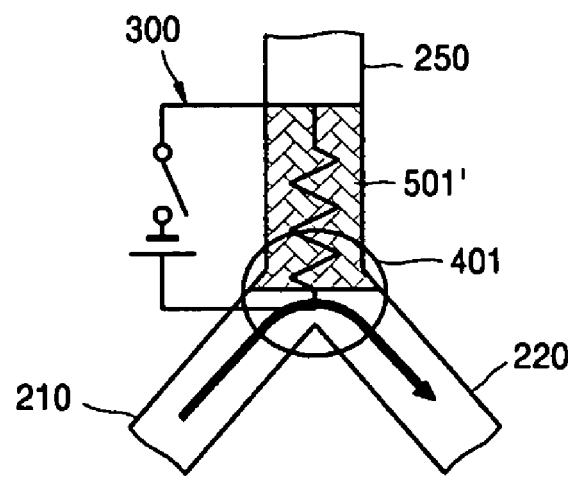
Figure 5F:
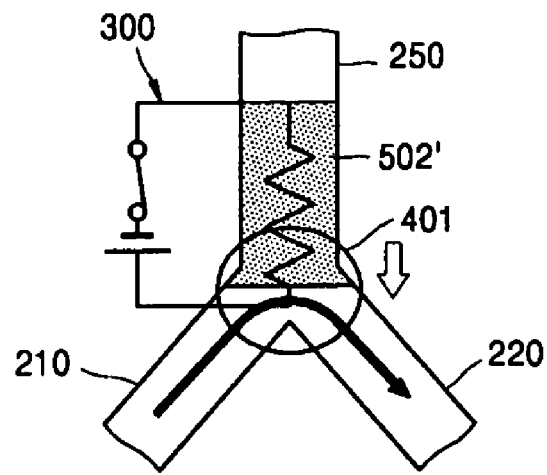

FIG. 5E through 5F show the process of converting the open mode to the closed mode. As shown in FIG. 5E, the magnetic field application portion 401 is located at the central portion of the Y-shaped connection portion. As shown in FIG. 5F, the heating portion 300 is operated to melt the magnetic wax plug 501' of FIG. 5E. A melted magnetic wax 502' is moved toward the Y-shaped connection portion by the magnetic field application portion 401. Next, the operation of the heating portion 300 is stopped and the melted magnetic wax 502' is cooled so that the mode is changed to the closed mode shown in FIG. 5A.

It is preferred that the application of the magnetic field by the magnetic field application portion precede in time the melting of the magnetic wax plug to prevent the unnecessary flux of the melted magnetic wax. However, the present invention is not limited thereto so that the application of the magnetic field and the melting of the magnetic wax plug can be performed in the reverse order or at the same time.

Figure 6:
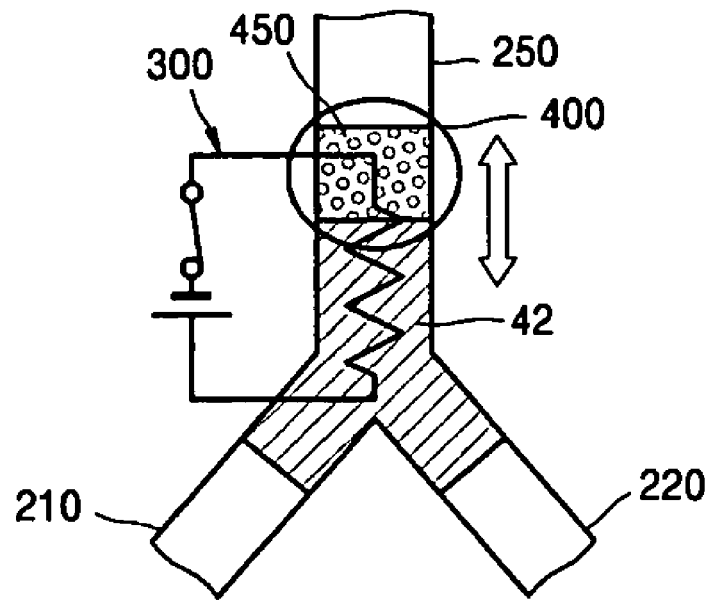
FIG. 6 shows a modification of the microvalve of FIG. 4.

FIG. 6 shows a modification of the microvalve of FIG. 4. Referring to FIG. 6, the inlet portion 210, the outlet portion 220, and the vent portion 250 constitute the micro fluidic structure and a solid wax plug 42 is provided in the micro fluidic structure. The heating portion 300 is provided to melt the solid wax plug 42. A ferrofluid 450 is injected into the vent portion 250 to be close to the solid wax plug 42. A magnetic field application portion 400 is provided to move the ferrofluid 450. When the solid wax plug 42 is melted, the ferrofluid 450 is moved so that the position of the solid wax plug 42 is changed.

Figure 7:
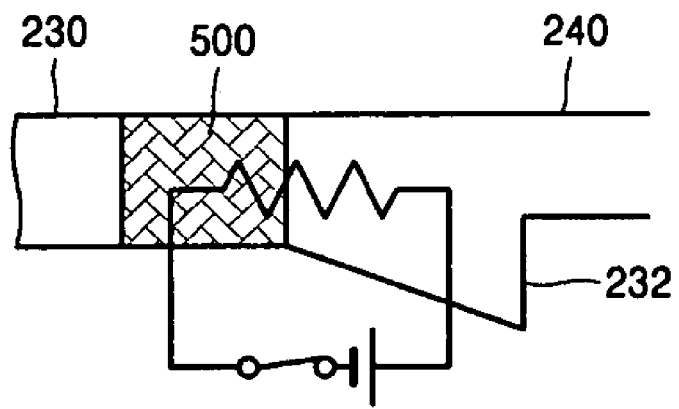
FIG. 7 shows a microvalve according to another embodiment of the present invention.

FIG. 7 shows a microvalve according to another embodiment of the present invention. Referring to FIG. 7, a microvalve according to the present embodiment includes an inlet portion 230 and an outlet portion 240 which are arranged linearly and a well portion 232 formed on a lower surface of a portion where the inlet portion 230 and the outlet portion 240 meet to be inclined with respect to the inlet portion 230. In the closed mode, a magnetic wax plug 500 is located in the inlet portion 230 at the upper stream of a channel with respect to the well portion 232.

When the mode is changed to the open mode, the heating portion 300 is operated to melt the magnetic wax plug 500. Then, the melted magnetic wax is moved along an inclined surface and contained in the well portion 232 so that the flux between the inlet portion 230 and the outlet portion 240 is allowed. In contrast, when the open mode is changed to the closed mode, a magnetic field is applied so that the melted magnetic wax is moved along the inclined surface toward the upper stream.

Figure 8:
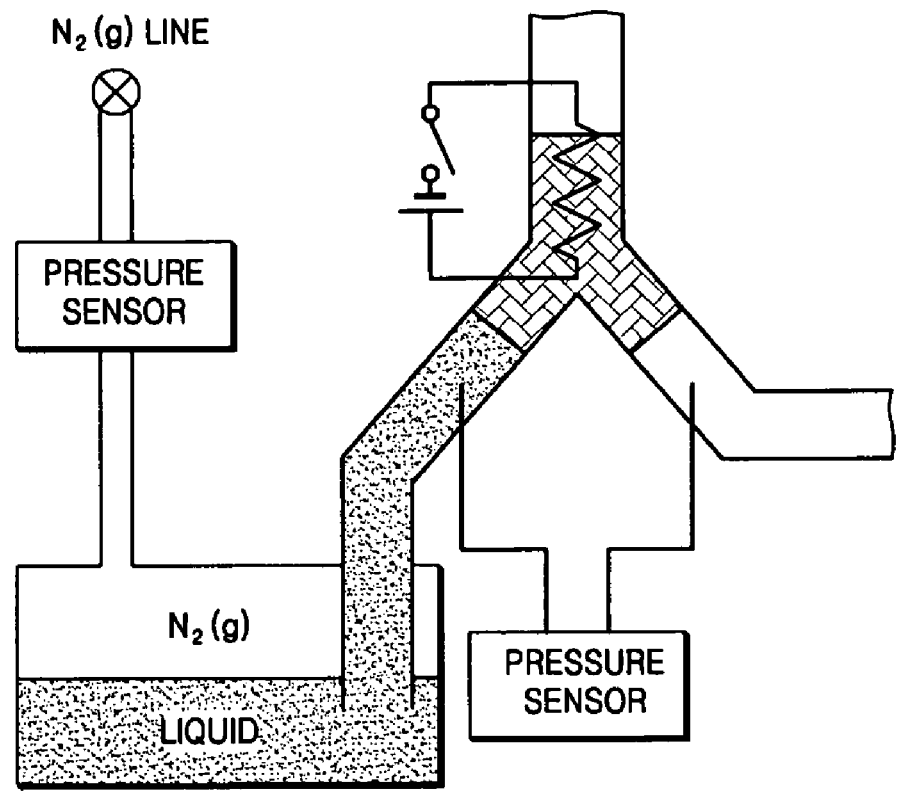
FIG. 8 shows the construction of a system for testing the performance of a microvalve.

FIG. 8 shows the construction of a system for testing the performance of a microvalve. An allowable pressure is measured using the system shown in FIG. 8 when the microvalve according to the present invention is in the closed mode. A ferrofluid and paraffin wax are mixed in a volume ratio of 1:2. "APG E18, 138 Gauss" by a U.S. company, Ferrotech, and "76232, sp 68-74° C." by a U.S. company, Fluka, are used for the ferrofluid and the paraffin wax, respectively. The volume of the magnetic wax plug is 0.2 µl. It is noted that the maximum allowable pressure of the microvalve according to the first embodiment reaches about 50 Psi.

Figure 9:
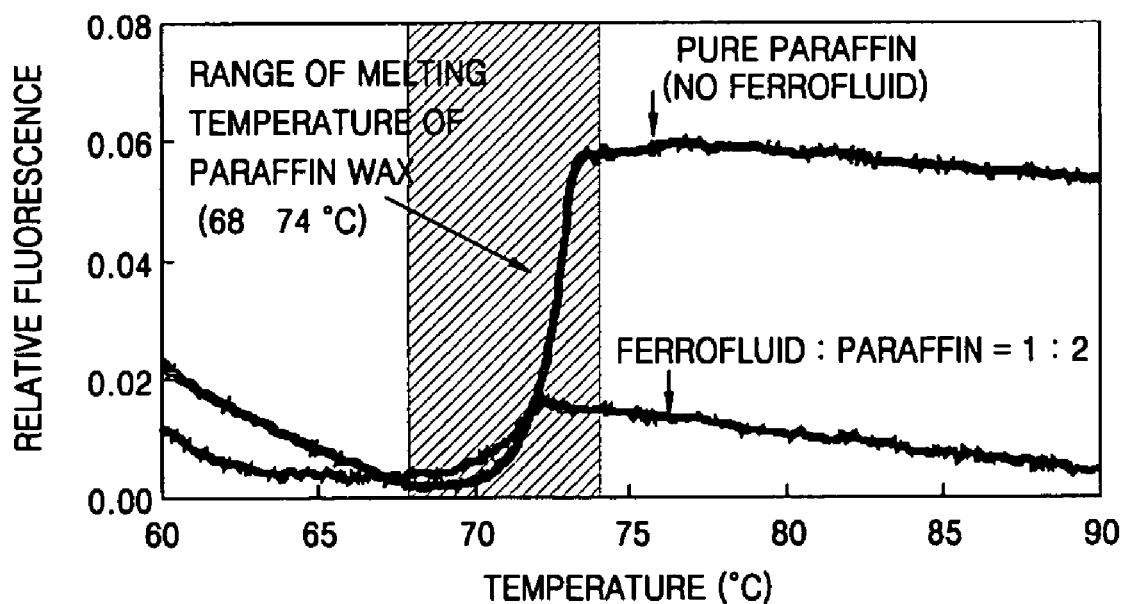
FIG. 9 is a graph showing a melting temperature according to the composition of a magnetic wax.

FIG. 9 is a graph showing a melting temperature according to the composition of a magnetic wax. A change of optical characteristic according to a change in temperature is measured for a pure paraffin wax and a magnetic wax having the same composition as the magnetic wax plug used in the above test to compare melting temperatures between the two waxes. The phase change of the magnetic wax occurs in a hatched area in the graph of FIG. 9. However, the phase change temperature of the magnetic wax is not limited to the hatched area in the graph and can vary according to the type of a mixed solid wax. By using this feature, magnetic waxes having various phase change temperatures according to the type and temperature condition of fluid of which flux is to be controlled can be provided.

In a method of controlling the flux of fluid using a magnetic wax according to the present invention, a magnetic wax is arranged in a predetermined section in the micro fluidic structure. The magnetic wax is made by homogeneously mixing a ferrofluid with a solid wax. The arrangement of the magnetic wax can be performed during the manufacturing process of a microvalve or a microchip according to the present invention.

To control the flux in the micro fluidic structure, heat is applied to the section in the micro fluidic structure to melt the magnetic wax and a magnetic field is applied to a position where the melted magnetic wax is supposed to arrive so that the magnetic wax is moved. The order of the application of the magnetic field and the melting of the magnetic wax plug is not fixed so that any of both steps can be performed first or both steps can be performed at the same time.

As described above, in the microvalve, the microchip, the microchip unit, and the flux control method according to the present invention, the structure required for the control of fine flux is simplified and the apparatus can be reused through a reversible mode change.

The microvalve having a magnetic wax plug according to the present invention including the micro fluidic structure can be applied to a variety of fields performing any kind of job by controlling the flux of gas or liquid in the micro fluidic structure. In particular, the present invention can be applied to a lab-on-a-chip in which a variety of constituent elements of a biological or biochemical laboratory are finely classified and represented on a single chip and contribute to the developments of DNA extraction, amplification, and detection techniques, cell separation and destruction test techniques, a cell virulence test technique, an HCS (high contents screening) technique, and a single molecule detection technique. Also, the microchip using the magnetic wax member according to the present invention, the microchip unit, and the flux control method can be used not only for the microvalve, but also for an actuator such as a micropump.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A microvalve having a magnetic wax plug, the microvalve comprising:
   a micro fluidic structure having an inlet portion and an outlet portion;
   a magnetic wax plug provided at a predetermined section where the inlet portion and the outlet portion meet, existing in a solid state, melted at a temperature higher than a predetermined temperature, and reversibly moving along a magnetic field, so as to control flux of a fluid through the micro fluidic structure;
   a heating portion provided corresponding to the section and heating the magnetic wax plug to be melted; and
   a magnetic field application portion selectively applying a magnetic field to a position where the melted magnetic wax plug arrives.

2. The microvalve as claimed in claim 1, wherein the micro fluidic structure comprises a Y-shaped connection portion which connects the inlet portion, the outlet portion, and a vent portion, and the magnetic wax plug is selectively located at the vent portion and the Y-shaped connection portion to allow or restrict flux of a fluid through the inlet portion and the outlet portion according to the location of the magnetic wax plug.

3. The microvalve as claimed in claim 1, wherein the micro fluidic structure further comprises a well portion provided in a lower portion of a position where the inlet portion and the outlet portion meet, inclined downward from the inlet portion toward the outlet portion, and the magnetic wax plug is selectively located at the inlet portion and the well portion to allow or restrict flux of a fluid through the inlet portion and the outlet portion according to the location of the magnetic wax plug.

4. The microvalve as claimed in claim 1, wherein the magnetic wax plug is formed of a mixture of ferrofluid and paraffin wax.

5. The microvalve as claimed in claim 1, wherein the ferrofluid is based on hydrocarbon.

6. The microvalve as claimed in claim 1, wherein the magnetic field application portion is a movable permanent magnet.

7. The microvalve as claimed in claim 1, wherein the magnetic wax plug selectively moves to at least two positions in a melting state, and the magnetic field application portion is a solenoid portion which is provided at at least two positions and selectively operated.

8. A microchip using a magnetic wax which performs a chemical reaction test with a small amount of a liquid test material using a micro fluidic structure formed on a substrate, the microchip comprising:
   a micro fluidic structure having a fine channel through which the liquid test material passes; and
   a magnetic wax member provided at a predetermined section of the micro fluidic structure, existing in a solid state, melted at a temperature higher than a predetermined temperature, and reversibly moving along a magnetic field, so as to control flux of a fluid through the micro fluidic structure.

9. The microchip as claimed in claim 8, further comprising a heating portion provided in a predetermined section of the micro fluidic structure and heating the magnetic wax member at a temperature higher than the predetermined temperature.

10. The microchip as claimed in claim 8, further comprising a solenoid portion provided at each of at least two positions to which the magnetic wax member selectively moves in a melted state.

11. The microchip as claimed in claim 8, wherein the micro fluidic structure comprises a Y-shaped connection portion which connects an inlet portion, an outlet portion, and a vent portion, and the magnetic wax member is selectively located at the vent portion and the Y-shaped connection portion to allow or restrict flux of a liquid test material through the inlet portion and the outlet portion according to the location of the magnetic wax member.

12. The microchip as claimed in claim 8, wherein the micro fluidic structure comprises an inlet portion, an outlet portion, and a well portion provided in a lower portion of a position where the inlet portion and the outlet portion meet, inclined downward from the inlet portion toward the outlet portion, and the magnetic wax member is selectively located at the inlet portion and the well portion to allow or restrict flux of a liquid test material through the inlet portion and the outlet portion according to the location of the magnetic wax member.

13. The microchip as claimed in claim 8, wherein the magnetic wax member is formed of a mixture of ferrofluid and paraffin wax.

14. The microchip as claimed in claim 13, wherein the ferrofluid is based on hydrocarbon.

15. A microchip unit using a magnetic wax including a microchip which performs a chemical reaction test with a small amount of a liquid test material using a micro fluidic structure formed on a substrate and a driving apparatus portion accommodating and driving the microchip, the microchip chip comprising:
   a micro fluidic structure having a fine channel through which the liquid test material passes; and
   a magnetic wax member provided at a predetermined section of the micro fluidic structure, existing in a solid state, melted at a temperature higher than a predetermined temperature, and reversibly moving along a magnetic field, so as to control flux of a fluid through the micro fluidic structure,
   wherein the driving apparatus portion comprises:
   a heating portion provided to correspond to a predetermined section of the micro fluidic structure and radiating heat to melt the magnetic wax member; and
   a magnetic field application portion selectively applying a magnetic field to a position where the melted magnetic wax member arrives.

16. The microchip unit as claimed in claim 15, wherein the magnetic wax member selectively moves to at least two positions in a melting state, and the magnetic field application portion is a solenoid portion which is provided at at least two positions and selectively operated.

17. The microchip unit as claimed in claim 15, wherein the micro fluidic structure comprises a Y-shaped connection portion which connects an inlet portion, an outlet portion, and a vent portion, and the magnetic wax member is selectively located at the vent portion and the Y-shaped connection portion to allow or restrict flux of a liquid test material through the inlet portion and the outlet portion according to the location of the magnetic wax member.

18. The microchip unit as claimed in claim 15, wherein the micro fluidic structure comprises an inlet portion, an outlet portion, and a well portion provided in a lower portion of a position where the inlet portion and the outlet portion meet, inclined downward from the inlet portion toward the outlet portion, and the magnetic wax member is selectively located at the inlet portion and the well portion to allow or restrict flux of a liquid test material through the inlet portion and the outlet portion according to the location of the magnetic wax member.

19. The microchip unit as claimed in claim 15, wherein the magnetic wax member is formed of a mixture of ferrofluid and paraffin wax.

20. The microchip unit as claimed in claim 19, wherein the ferrofluid is based on hydrocarbon.

* * * * *